United States Patent [15] 3,646,739
Dahl [45] Mar. 7, 1972

[54] SAFETY LAWN MOWER
[72] Inventor: Einar S. Dahl, Galesburg, Ill.
[73] Assignee: Outboard Marine Corporation, Waukegan, Ill.
[22] Filed: Nov. 21, 1969
[21] Appl. No.: 878,865

[52] U.S. Cl. .................................................56/320.1, 56/320.2
[51] Int. Cl. .......................................................A01d 35/26
[58] Field of Search .....................56/25.4, 255, 320.1, 320.2; 273/DIG. 8

[56] References Cited

UNITED STATES PATENTS

| | | | |
|---|---|---|---|
| 2,659,191 | 11/1953 | Miller et al. | 56/255 X |
| 2,737,003 | 3/1956 | Beers | 56/25.4 X |
| 2,791,080 | 5/1957 | Shaw | 56/25.4 |
| 2,806,339 | 9/1957 | Whitney | 56/25.4 |
| 2,928,223 | 3/1960 | Danuser | 56/25.4 |
| 2,963,842 | 12/1960 | Estes | 56/25.4 |
| 3,118,267 | 1/1964 | Shaw | 56/255 X |
| 3,242,660 | 3/1966 | Gary | 56/255 X |
| 3,244,419 | 5/1966 | Lerman | 273/DIG. 8 |

Primary Examiner—Louis G. Mancene
Assistant Examiner—J. A. Oliff
Attorney—John W. Michael, Gerrit D. Foster, Bayard H. Michael, Robert K. Gerling, Paul R. Puerner, Joseph A. Gemignani, Andrew O. Riteris and Spencer B. Michael

[57] ABSTRACT

A lawn mower including a part of a housing for capturing solid particles thrown by action of the cutting blade. In one embodiment, the part of the housing comprises a penetrable liner extending adjacent to the path of the tip of the cutting blade and cooperating with the housing to form a series of pockets for receiving solid articles which penetrate the wall of the liner. In another embodiment, one or more pads of cellular material are carried by the housing in position to be struck by objects thrown by action of the cutting blade. Upon striking of the cellular material, the objects become imbedded, to thereby remove them from the whirling mass of material within the blade housing. In accordance with the third embodiment, a trap door and a trap are provided whereby solid objects are permitted to pass out of the circular area of the path of travel of the blade, but are intercepted within a trap formed inside of the blade housing.

22 Claims, 17 Drawing Figures

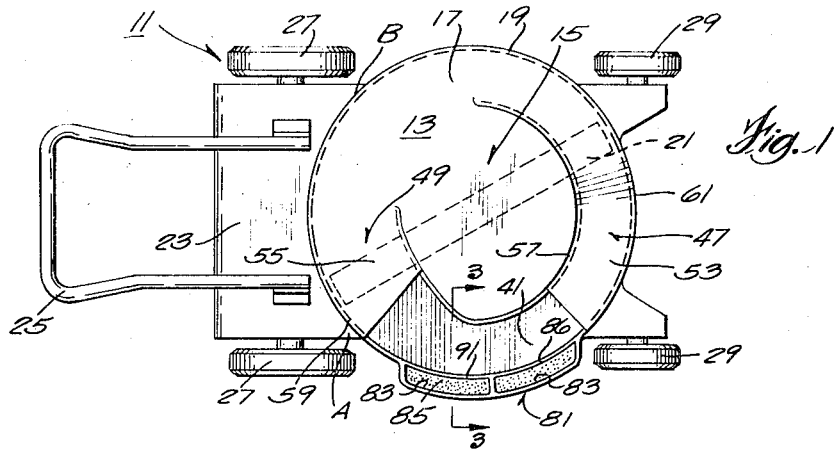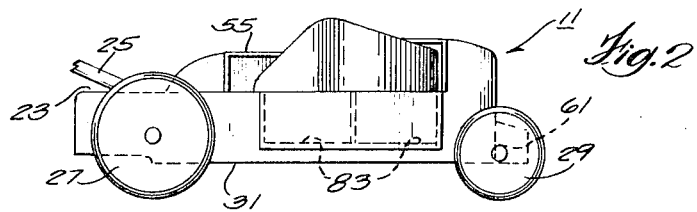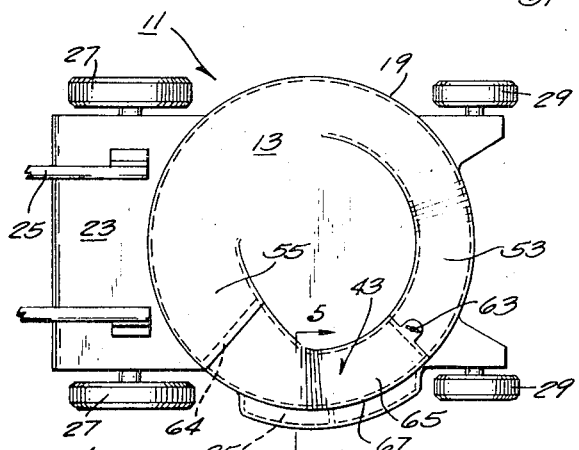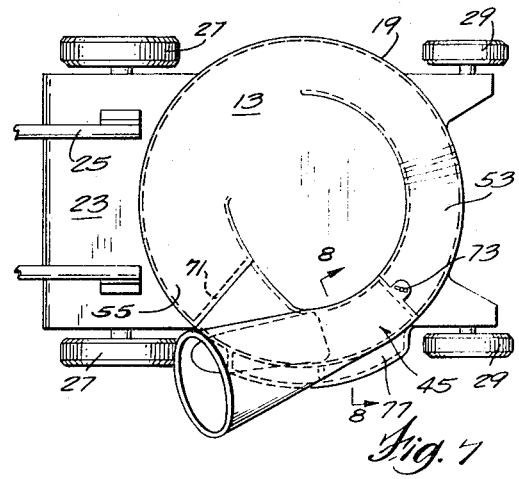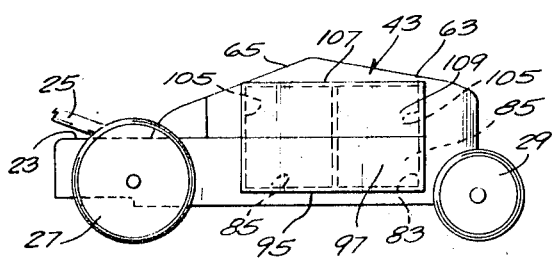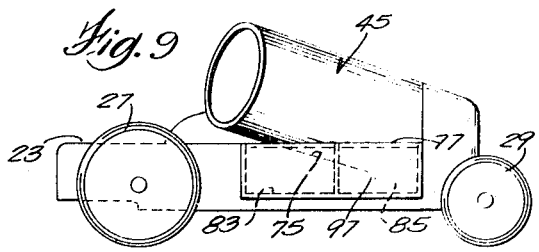

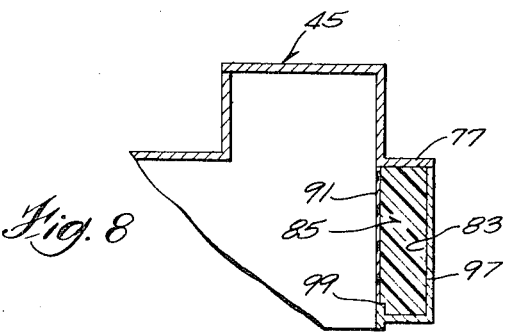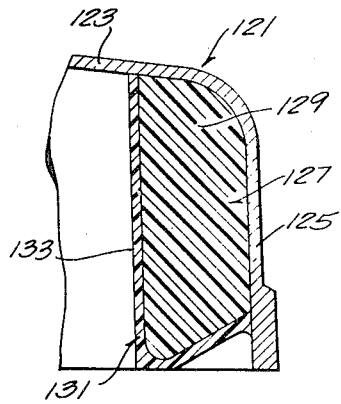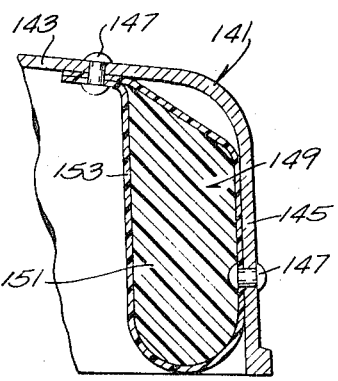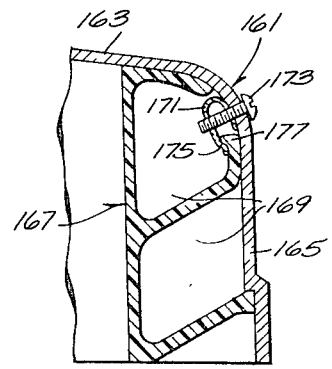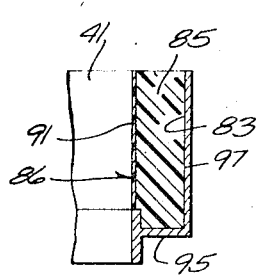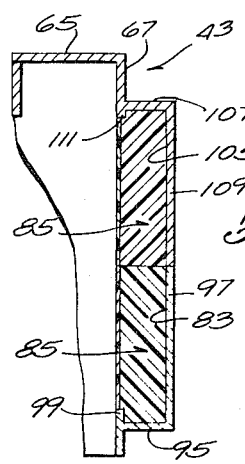

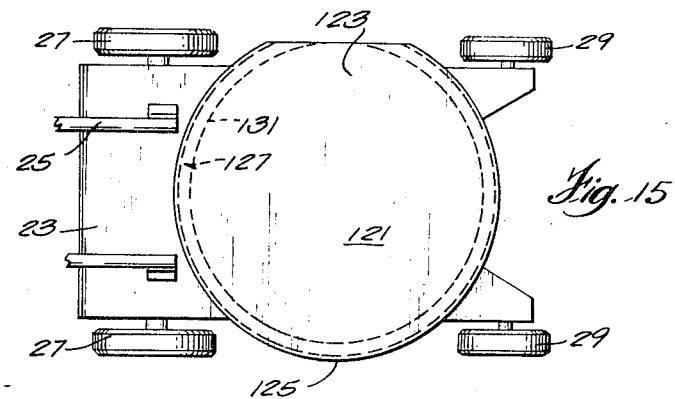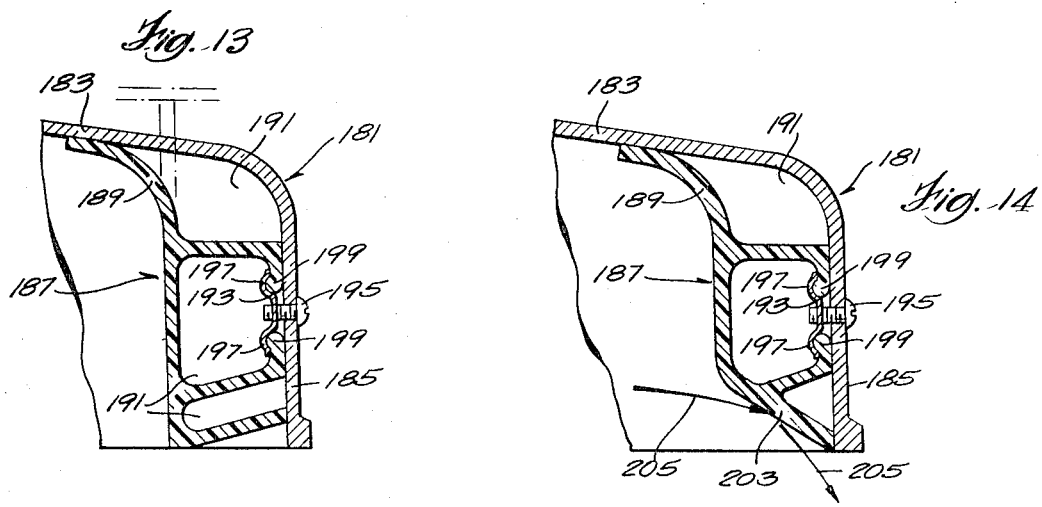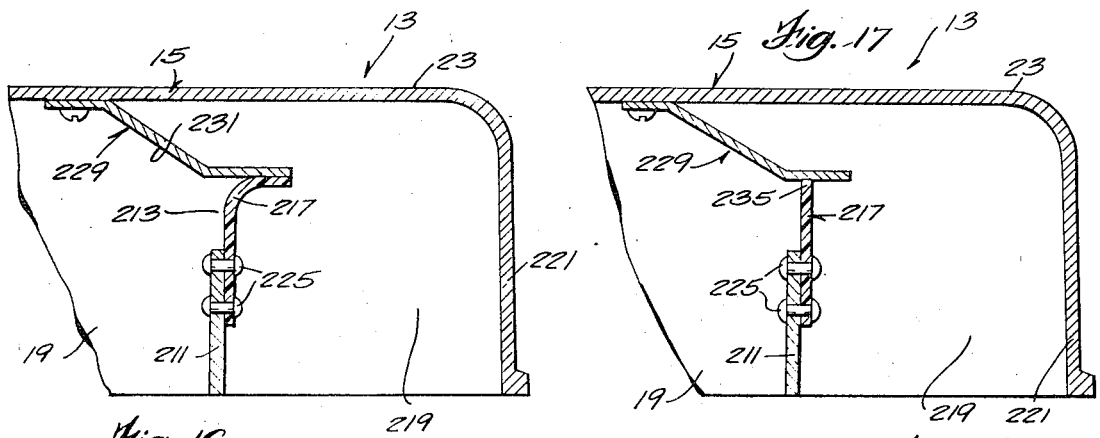

3,646,739

SAFETY LAWN MOWER

BACKGROUND OF THE INVENTION

The invention relates to rotary lawn mowers and particularly to chuteless lawn mowers such as are shown for instance, in the United States patent application Ser. No. 788,803 filed on Jan. 3, 1969, by Earl H. Kidd, entitled "Chuteless Lawn Mower Housing" assigned to the assignee of this application.

The invention also relates to lawn mower safety and to arrangements for trapping or deflecting solid particles such as stones and twigs. Examples of prior arrangements are shown in the Irgens U.S. Pat. No. 3,420,041 and the Heidner U.S. Pat. No. 3,453,812.

The invention also relates to lawn mower housings which are usable in a first arrangement with a chute or in a second arrangement in a chuteless manner in which there is a more or less continuous peripheral vertical wall about the path of the outer end of the cutter blade.

SUMMARY OF THE INVENTION

The invention provides a rotary lawn mower which is operable without a chute and which is arranged to cause removal of solid particles, such as twigs and stones, from the flowing stream of grass-clipping-laden air within the blade housing. Several arrangements or traps are provided. In one instance, a lawn mower is provided with one or more pads or liners which are located along the inside vertical wall of the blade housing. The liners can extend completely around the path of the cutter blade, but can be most effectively used in the area between approximately 1:30 o'clock and 5:00 o'clock (when viewed from above with a clockwise rotating cutter blade and with 12:00 o'clock being at the forward center of the blade housing). The liners or pads can be constructed to cooperate with the housing to provide voids or cavities to receive solid articles puncturing the liner or can be, in part, of foamed or cellular plastic material so that upon striking thereof by solid particles, such particles penetrate and become imbeded in the pads, as will be described in the following general description.

When using cellular plastic material, at least one wall of the pad, i.e., the wall adjacent to the path of the cutter blade travel, is preferably sealed against the entry of grit and moisture so as to prevent the pad from absorbing grit and moisture and becoming solid, i.e., as compared to cellular. In this regard, a thin plastic film material is united to one wall of the cellular pad material to exclude moisture and grit and to provide what is, in effect, an operating wall of the blade housing when the pads are properly located.

The liners or pads can be applied to the interior of the blade housing in various manners, as for instance, by insertion into pockets provided for such purposes or by the use of rivets or bolts for attaching such liners or pads in proper location to the blade housing.

Another aspect of the invention resides in the provision of a trap door along the periphery of a rotary mower blade housing and particularly at the rear thereof, which trap door, upon striking by a solid particle, will permit exiting of the solid particle into a blade-housing portion which causes such exiting solid particles to be deflected downwardly toward the ground in such manner so as to prevent dangerous tangential escape.

Once principal object of the invention is to provide a chuteless mower which is reliable in operation and economical to construct and which will effectively capture solid particles, such as stones and twigs, to prevent dangerous escape of such particles from the lawn mower during operation.

Another object of the invention is to provide a pad or liner which may be employed in a lawn mower of the type described in the preceding paragraph and which will afford penetration and capture or imbeding therein of solid particles incident to travel of such particles within a blade housing.

Still another object of the invention is the provision of a liner or pad, such as referred to in the preceding paragraph, which is constructed of cellular material and is sealed along one surface to prevent entry of moisture and dirt into the pad through said one surface. Such sealing can be in the form of a thin film of rupterable plastic material.

Another object of the invention is to provide a rotary lawn mower including a trap door which permits exiting of solid particles from within the circular confines of the area in which the cutter blade rotates and into a blade housing portion which is designed to cause such exiting particles to be deflected downwardly toward the ground and thereby prevent dangerous escape of such particles.

Other objects and advantages of the invention will become known from the following description and accompanying drawings in which:

DRAWINGS

FIG. 1 is a top plan view of a lawn mower embodying various of the features of the invention.

FIG. 2 is a partial side elevational view of the lawn mower shown in FIG. 1.

FIG. 3 is an enlarged fragmentary sectional view taken along line 3—3 of FIG. 1.

FIG. 4 is a fragmentary top plan view of the lawn mower shown in FIG. 1 with a cover attached thereto.

FIG. 5 is an enlarged fragmentary sectional view taken along line 5—5 of FIG. 4.

FIG. 6 is a fragmentary side elevational view of the mower shown in FIG. 4.

FIG. 7 is a top plan view of the lawn mower shown in FIG. 1 with an attached chute.

FIG. 8 is an enlarged fragmentary sectional view taken along line 8—8 of FIG. 7.

FIG. 9 is a side elevational view of the lawn mower shown in FIG. 7.

FIG. 10 is a sectional view of another lawn mower incorporating another embodiment of the invention.

FIG. 11 is a view similar to FIG. 10 illustrating still another embodiment of the invention.

FIG. 12 is a view similar to FIG. 10 illustrating still another embodiment of the invention.

FIG. 13 is a view similar to FIG. 10 illustrating still another embodiment of the invention.

FIG. 14 is a view similar to FIG. 10 illustrating still another embodiment of the invention.

FIG. 15 is a top plan view of the lawn mower fragmentarily shown in FIG. 10.

FIG. 16 is an enlarged fragmentary view of still another embodiment of the invention.

FIG. 17 is an enlarged fragmentary view in section of still another embodiment of the invention.

GENERAL DESCRIPTION

Shown in FIG. 1 of the drawings is a chuteless lawn mower 11 which, except as specifically described herein, is constructed in general accordance with the before-mentioned U.S. Pat. application Ser. No. 788,803 entitled "Chuteless Lawn Mower Housing" and filed on Jan. 3, 1969, by Earl H. Kidd.

Chuteless blade housings in accordance with the invention can have a more or less flat deck or top or can be formed with a radial section having a downwardly concave upper and radially outer wall in the area of the path of the outer edge of the cutter blade.

More specifically, the lawn mower 11, shown in FIG. 1, comprises a housing 13 which includes a top wall or deck 15 having a main portion 17 and a generally continuous peripheral wall 19 depending from the deck main portion immediately radially outwardly of the path of a rotatable cutter blade 21 which is conventionally supported for rotation within the blade housing 13. As shown, the deck 17 has a portion 23 extending rearwardly beyond the path of the cutter blade, which portion supports an operating handle 25 and two rear wheels 27. The wheels 29 at the front are also supported in a conventional manner by the blade housing 13 to support the lawn mower 11 above the ground.

Arrangements can be provided for raising and lowering the wheels 27 and 29 relative to the housing 13 to vary the height of cut. Alternatively, the motor or engine (not shown) and cutter blade 21 can be vertically adjusted so as to vary the height of cut as disclosed generally in the allowed U.S. Pat. No. 3,611,864 issued on Oct. 12, 1971, and entitled "Safety Sidewall Lawn Mower." Such construction would also serve, at the same time, to maintain the lower peripheral edge 31 (FIG. 2) of the blade housing 13 at a more or less constant spacing from, but nevertheless close to, the ground so as to minimize the possibility of dangerous escape of solid particles as disclosed generally in the before mentioned U.S. Pat. No. 3,611,864 issued on Oct. 12, 1971.

In the disclosed construction, the deck 15 is provided with an opening 41 (See FIG. 1) which may be closed by a cover 43 (See FIGS. 4 and 6) or which may be connected to a chute 45 (See FIGS. 7 and 9). The opening 41 is located intermediate of a downwardly open and arcuately extending channel having front and rear sections 47 and 49 respectively. The channel is provided by respective front and rear top wall portions 53 and 55, by an inner wall 57, and by respective front and rear outer wall portions 59 and 61 respectively, which merge into the otherwise generally continuous peripheral wall 19 of the housing 11. The front channel section 47 begins to rise from the top deck 15 at about 9:00 or 10:00 o'clock (when viewed from above and when 12:00 o'clock is located at the front center of the blade housing 13) and increases in height above the deck 15 to a position about 1:30 o'clock where the channel is interrupted by the opening 41. At about 4:30 to about 5:30 o'clock the rear channel section 49 is formed and decreases in height until about 6:00 0'clock when the channel disappears into the otherwise generally flat main deck portion 17. The inner wall 57 of the channel continues between the front and rear channel sections 47 and 49, increasing in height to a maximum at about 3:00 o'clock and then decreasing in height until commencement of the rear channel section 49.

The opening 41 is adapted to be closed by the cover 43 which is shown in FIGS. 4 and 6 and which has a tab or ear 64 which interfits under the rear top wall portion 55 adjacent the forward part of the rear channel section 49. At its forward end, the cover 43 merges with the forward channel section 47 and is removably connected thereto by a removable screw 63. The cover, as shown in FIG. 5, includes a top wall 65 and an outer or side wall 67 with the top wall 65 following the contour of the upper edge of the inner channel wall 57 and with the sidewall 67 extending downwardly to the continuous peripheral wall 19 extending below the level of the top deck 17. In the area between approximately 1:30 o'clock and 5:30 o'clock, the cover 43 completes the otherwise interrupted channel, which channel, when completed by the cover 43, increases in height to about 3:00 o'clock and thereafter decreases.

Alternatively, a discharge chute 45, shown in FIGS. 7, 8 and 9 can be connected to the housing 13 in covering relation to and so as to communicate with the opening 41. As with the cover 43, the discharge chute 45 is fabricated so as to have a tab or ear 71 which interfits under the forward end of the top wall 55 of the rear channel section 49 and has a forward portion which conforms to the margin of the rearward end of the front channel section 47 and can be attached to the blade housing 13 by a removable screw 73. In general, the chute is constructed so as to effectively close the opening while, at the same time, providing a generally tangentially rearwardly and upwardly inclined delivery chute to which a bag or grass collector can be attached.

The chute 45 includes, as shown in FIG. 9, a lower wall 75 which extends in an inclined fashion downwardly through the opening 41 and terminates at about 3:00 o'clock in the area immediately above the path of the cutter blade 21 so as to be in a position to guide air borne grass upwardly through the chute 45. As shown best in FIG. 8, the chute further includes a radially outwardly extending lip 77 located generally in the plane of the top deck, i.e., adjacent to the plane of the top edge of the wall 19.

It should be noted that the portion of the inner wall 51 extending between the front and rear channel sections 47 and 49 and above the top walls 53 and 55 can alternatively be provided as parts of the cover 43 and chute 45.

In accordance with the invention, the lawn mower 11 is provided with means for trapping objects thrown by the action of the cutter blade 21 toward the inside of the peripheral wall 19. As will be disclosed in greater detail, various arrangements can be employed to capture such solid articles, as for instance, stones twigs.

In order to facilitate capture or trapping of solid particles, such as stones and twigs, etc., when the housing is arranged in a chuteless arrangement, i.e., with the cover 43 attached, means in the form of one or more solid particle capturing liners, pads, or members 85 (See FIG. 1) can be retained in the housing 13 adjacent to the periphery of the path of the cutter blade 21. In this regard, the housing 13 is constructed with a protuberance 81 providing one or more recesses or pockets 83 to receive one or more of the pads 85 in such fashion that one surface 86 of such pads 85 forms a continuation of the otherwise smooth interior circular peripheral wall 19 of the blade housing 13 around the path of the tip of the cutter blade 21. The pads or members 85 are designed to afford capture and retention of solid particles, such as stones or twigs, and are fabricated of foamed or cellular plastic material. As a consequence, solid particles striking the pads 85 will penetrate and become imbeded in the pads. One such material from which such pads can be constructed is foamed polyurethane.

The pad 85 can be fabricated in any shape. However, it is preferable to form the pad 85 so that the surface 86 is arcuate so that, when the pad is in position within the housing 13, the surface 86 forms a continuation of the otherwise smooth inner circular interior of the peripheral blade housing wall 19.

The pads 85 are preferably protected against the entry of grit or moisture which could have the effect of decreasing the cellular nature of the pad by filling the cells, such that the pad becomes more like a solid material which would not have the desired capacity for penetration and retention of solid particles. Accordingly, means are provided for preventing entry into the pad 85 of dirt and moisture. While various arrangements can be employed, in accordance with the invention, pad 85 is provided with a rupterable or penetrable skin or film 91 which excludes moisture and grit from the pad 85. Such film 91 can be provided by spraying the cellular material with a film of nylon, or other like material. Alternatively, the pad 85 can be packaged in a bag of nylon, mylar, vinyl, or other like material. The material used for the skin 91 should be rupterable or penetrable but, at the same time, should not readily tear or shred.

In addition to preventing entry of dirt or moisture into the cells or pores of the pad 85, the film or skin 91 can also assist in retaining solid particles within the pad. Particularly when the pads 85 are located in recesses in the wall of the housing, it is desirable that at least the outer surface 86, constituting a continuation of the smooth circular inner wall of the housing, be formed by the film or skin 91 as described above.

In accordance with the invention, it is desirable to provide solid particle trapping pads 85, particularly in the 1:30 to 5:00 o'clock area which is believed to experience the largest number of solid particle impacts. Accordingly, the lawn mower shown in FIGS. 1 through 9 of the drawings includes in this area two upwardly and inwardly open recesses 83 for snugly receiving the pads 85. As shown in FIG. 5, each pocket 83 is provided with a bottom wall 95 and with sidewalls 97. Means are provided to retain the pads 85 in proper position. While various arrangements can be employed, in the disclosed construction, such means is in the form of a lip 99 which extends along lower and side edges of each pocket 83 and which serves to retain the pad 85 in proper position by preventing the pad from falling inwardly of the housing into the path of the cutter blade. Preferably, as already mentioned, the surface 86 of the pad 85 which is exposed to the interior of the blade housing has a partially cylindrical surface so as to conform to the cylindrical inner wall surface of the housing. In addition, this surface is preferably provided with a covering of the film or skin 91.

The cover 43 is also preferably provided with pads 85 along the outer wall 67. In this regard, as shown best in FIGS. 5 and 6, the outer vertically extending wall 67 of the cover is provided with one or more recesses or pockets 105, each having a top wall 107 and sidewalls 109. Means in the form of a lip 111 extending around the edges of the side and top walls 107 and 109 is provided to retain the pads 85 in proper position. As in connection with the pads 85 received in the pockets 83, the pads 85 received in the pockets 105 are dimensioned such that a snug fit is provided, which fit facilitates retention of the pads 85 in the cover 43 during assembly of the cover 43 to the blade housing 13.

FIG. 6 shows two pockets 85 in the blade housing 13 and two pockets 105 in the cover, which pockets are substantially of the same dimension so as to accommodate pads 85 of the same size and therefor afford economy of production, storage and utilization. As a consequence, the uppermost part of the outer sidewall 67 of the cover 43 is not provided with a solid particle capturing pad. However, the invention is not so limited and extends to covering the entire outer wall 67 of the cover 43, particularly in the area from about 1:30 to about 5:00 o'clock.

The before mentioned lip 77 on the chute 45 extends in covering relation to the otherwise open top of the housing pockets 83. In a similar manner, the open condition of the top of the housing pockets 83 is closed by the cover 43.

One of the features of the invention resides in the ability to replace the pads 85 as they become filled with solid particles or as their effectiveness for capturing solid particles diminishes with use. Such replacement can be accomplished simply by manually withdrawing the previously inserted pad 85 and by inserting a new pad 85. It will be understood that in the illustrated construction, the cover 43 is removed to afford access to the pockets 95 and 105 for withdrawal and replacement of the pads 85.

When the mower 11 is used with the chute 45, the pads 85 are preferably retained in the housing pockets 95 in order to maintain a smooth circular inner blade housing wall. However, because of the chute 45, the resultant mass flow through the chute 45 is such that the solid particle capturing function of the pads in the housing is reduced. The chute 45 is also shown without pads because the mass flow is primarily through the chute and not at such angle to the walls of the chute as could readily result in penetration and retention of solid particle material by pads arranged along such walls.

The invention also extends to other arrangements or means within the housing for trapping solid particles thrown by rotating action of the cutter blade. FIG. 15 shows in plan view and FIG. 10 shown in cross section a lawn mower housing 121 having a top deck 123 and a depending peripheral wall 125 similar to the wall 19. Also shown in FIGS. 10 and 15 is another means on the inside of the housing for trapping objects thrown by rotating action of the cutter blade. More particularly, such means is shown best in FIG. 10 and comprises a liner or pad 127 formed by a body or portion 129 of polyurethane pliable foam which is cemented or otherwise united to a partial skin or covering 131 of vinyl which can be approximately one thirty-seconds of an inch thick. In turn, the liner 127, including the polyurethane portion 129 and the vinyl skin 131, are cemented or otherwise suitably attached to the blade housing 121 so that the surface 133 of the liner is located adjacent to the path of the tip of the cutter blade.

The liner 127 can extend substantially entirely around the inner periphery of the wall 125 as shown generally in FIG. 15, whereby a more or less continuous circular or cylindrical wall adjacent to the path of the tip of the cutter blade is provided. Alternatively, the liner can be attached in segments to the housing at appropriate locations as, for example, between 1:30 o'clock and about 5:00 o'clock. When the liner segments are employed, it is preferred to form the blade housing 121 with pockets to receive the segments so as to maintain a generally continuous and cylindrical inner wall adjacent to the path of the tip of the cutter blade.

Another embodiment of the means for trapping objects thrown by the action of the cutter blade is shown in FIG. 11 wherein there is disclosed a blade housing 141 having a top deck 143 and a depending wall 145 such as the wall 125 shown in FIG. 15. Suitably attached to the housing 141, as by rivets, or by any other suitably way, as for instance cement, is a liner comprising an inner part of polyurethane foam and a complete casing of rupterable or penetrable vinyl material 153. The liner 149 can be applied either more or less totally around the path of the cutter blade as shown in FIG. 15 or in one or more segments. As with respect to the modification of FIG. 10, it is desirable to maintain a generally continuous and cylindrical wall adjacent to the path of the tip of the cutter blade.

Shown in FIG. 12 is still other means for trapping solid particles thrown by action of the cutter blade. The FIG. 12 embodiment includes a blade housing 161 having a top deck 163 and a peripheral wall 165 similar to the arrangement shown in FIG. 15. The trapping means comprises an extruded liner 167 of vinyl or other similar material which is form so as to cooperate with the blade housing 161 to provide one or more voids, cavities or pockets 169 for collecting solid particles which rupture and pass through the vinyl liner 167. Various arrangements can be employed for attaching the liner 167 to the housing 161, as for instance cement. In the construction disclosed in FIG. 12, there is disclosed a clip 171 which is attached to the housing 161 by a screw 173 and which has a lip 175 clamping a free end portion 177 of the liner 167 so as to hold the liner in proper place.

As with the embodiments shown in FIGS. 10 and 11, the liner 167 can extend substantially completely around the wall 165 or can extend in segments. However, it is desirable to maintain a generally continuous and cylindrical wall adjacent to the path of travel of the tip of the cutter blade.

FIG. 13 discloses still another embodiment of the invention which is similar to FIG. 12. In FIG. 13 there is shown a blade housing 181 having a top deck 183 and a peripheral wall 185 which is similar to that shown in FIG. 15, together with means for trapping solid objects in the form of an extruded vinyl liner 187 having an upper portion 189 which extends vertically and has sufficient resiliency or flexibility so as to afford inward bending thereof when the height of the portion 189 is greater than necessary to reach the top deck 183. As a consequence, engagement of the liner 187 with the top deck 183 is maintained, notwithstanding variation in height of the top deck 183 at various points around the peripheral wall 185. As shown in FIG. 13, the upper vertically extending portion 189 cooperates with other portions of the liner 187 and with the housing 181 to provide a series of voids or cavities 191 for collecting solid articles which penetrate the vinyl liner 187. Also shown in FIG. 13 is means for attaching the liner 187 to the housing 181 in the form of a clip 193 which is connected to the housing 181 by a screw 195 and which includes a pair of tabs 197 engaging associated free end portions 199 of the vinyl liner 187 to detachably connect the liner 187 in proper position on the housing 181. The liner 187 can extend relative to the housing and to the cutter blade as explained with respect to the modifications of FIGS. 10, 11 and 12.

FIG. 14 is still another embodiment of the invention which is the same as the embodiment of FIG. 13, except that the liner 187 is modified at the bottom to provide a surface 203 which extends radially outwardly and downwardly in position to deflect striking solid articles toward the ground as shown by the arrows 205 and thereby prevent exit of such articles from the housing 181 in such manner as to cause injury to the user or bystanders. The liner 187 can extend relative to the housing and the cutter blade as explained with respect to the modification of FIGS. 10, 11 and 12.

In all of the liners of FIGS. 10 through 14, the vinyl material is rupterable or penetrable to permit penetration by articles thrown there against by action of the cutter blade. In the embodiments of FIGS. 10 and 11, such articles become imbeded in the cellular polyurethane, whereas in FIGS. 12, 13 and 14, the particles are captured within the cavities or voids 169 and 191. In all of the embodiments of FIGS. 10 through 14, various arrangements can be employed to detachably connect the liners to the peripheral wall of the housing and it is preferable to maintain a generally continuous and cylindrical wall adjacent to the path of the tip of the cutter blade.

The invention also contemplates a further arrangement for trapping solid particles within a chuteless mower housing to prevent their dangerous exit from the housing by means of a "trap door" arrangement at the rear of the housing.

More particularly, as shown in FIG. 16, the rear deck portion 23 of either the lawn mower of FIG. 1 or of the lawn mower of FIG. 15, extends rearwardly, beyond the circular outline of the peripheral wall 19 adjacent to the path of travel of the tip of the cutter blade 21. In accordance with the invention, the rearward portion of this rearward circular wall is provided with one or more openings or "trap doors" which can extend completely, more or less, around the periphery of the path of the cutter blade. However, in the disclosed construction, the trap door extends approximately from A to B in FIG. 1, i.e., approximately from about 5:00 to about 7:00 o'clock. While various arrangements can be employed to provide a trap door, in the arrangement disclosed in FIG. 16, the peripheral wall 19 includes a portion 211 which is spaced from the housing deck 15 by an opening 213 which is normally closed by means in the form of a rubber guard or shoe 217 which can be connected wither to the circular wall 19 or to the top deck 15. The guard 217 is arranged so that it is biased into a position closing the opening 213 so as to retain the usually generally smooth circular inner wall adjacent the path of the tip of the cutter blade. However, upon the striking of the guard 217 by a solid particle, such as a rock or twig, the guard 217 will yield permitting the particle to travel rearwardly into the trap 219 which is provided, in part, by a skirt or wall 221 extending downwardly from the rear portion 23 so as to extend below the top edge of the wall portion 211 so as to intercept any solid particles passing through the opening 213. Thus, any exiting solid particle will either encounter the guard 219 and spend itself or will encounter the rear wall 221 and be deflected toward the ground. As a consequence, solid particles which are picked up and enter into the circulating mass within the blade housing 13 are permitted to escape in such manner so as to avoid danger or harm to the operator or bystanders.

The guard 217 can extend all or most of the way from either of the top deck 15 or the wall portion 211 to the other of the top deck 15 and wall portion 211. In this regard, the guard 217 can be constructed of rubber or other resilient flexible material and with sufficient height to close, or nearly close, the opening 213 regardless of variations in height of the opening, due to the resilient flexibility of the guard 217. In other words, whenever the length of the guard 217 is greater than the height of the opening 213, the flexibility of the guard 217 will permit bending in the same manner, for instance, as that shown with respect to portion 189 of the liner 187.

Various arrangements can be employed. In FIG. 16, the guard 217 is suitably attached, as by rivets 225, to the portion 211 of the peripheral wall and extends upwardly into a rearwardly curving portion 227 leading to an area of engagement with a cooperating resilient spring or member 229 which is suitably attached, as by a screw, by a rivet, by welding, or otherwise, to the top deck 15 and which extends generally rearwardly and is biased into engagement with the guard 217. The member 229 includes a downwardly and inwardly inclined surface 231 for deflecting objects rearwardly and downwardly, whereby striking objects are deflected either toward the ground or toward the guard 217 for passage into the trap 219.

The embodiment shown in FIG. 17 is constructed the same as the embodiment of FIG. 16, except that the height of the guard 217 is shortened so that the guard 217 terminates with a vertically extending free end 235 in adjacent relation to the member 229. As already indicated, the guard 217 could extend from either the wall portion 211 of the top deck 15 toward the other of the wall portion 211 and top deck 15 and could be tailored to terminate adjacent to the top deck 15 or to overlap the rear of the top edge of the wall portion 211. If desired, the trap door arrangement disclosed at the rear of the mower could be employed anywhere along or completely around the periphery of the path of the tip of the cutter blade.

Various of the features of the invention are set forth in the following claims.

What is claimed is:

1. A lawn mower comprising a rotary cutting blade and a blade housing supporting said cutting blade and including a top deck having a main portion with an aperture located between about 1:30 and about 5:00 o'clock and a rear portion extending rearwardly from said main portion, a circular inner wall depending from said housing main portion adjacent to the path of said cutting blade, said inner wall having therein a pocket located between about 1:30 and about 5:00 o'clock and an opening located between about 5:00 and about 7:00 o'clock, a pad of cellular material located in said pocket and having a surface conforming to the circular formation of said inner wall and comprising a skin of impervious plastic material, a cover releasable connected to said housing in covering relation to said aperture, said cover including an upright wall having a recess extending in the area between about 1:30 and about 5:00 o'clock, another pad of cellular material received in said recess and having a skin of impervious plastic material, a skirt extending downwardly from said rear deck portion in generally opposed relation to said inner wall and below the lower edge of said opening, a resilient member fixed to said inner wall adjacent to the lower edge of said opening, and a second member connected to said top deck and normally in engaged relation to said resilient member fixed to said inner wall so as to thereby close said opening.

2. A lawn mower comprising a rotary cutting blade, a blade housing supporting said cutting blade and including a top deck and a circular wall adjacent to the path of said cutting blade, and a liner of cellular material located within said housing adjacent to the path of said cutting blade for trapping objects thrown by rotating action of the cutting blade.

3. A lawn mower in accordance with claim 2 wherein said liner is located between about 1:30 and about 5:00 o'clock.

4. A lawn mower in accordance with claim 2 wherein said liner has a skin of impervious material.

5. A lawn mower comprising a rotary cutting blade, a blade housing supporting said cutting blade and including a top deck and a circular wall adjacent to the path of said cutting blade, a pocket formed in said wall and a pad of cellular material located within said pocket for trapping objects thrown by rotating action of the cutter blade.

6. A lawn mower in accordance with claim 5 wherein said top deck includes therein an opening located between about 1:30 and about 5:00 o'clock, whereby to afford access to said pad.

7. A lawn mower in accordance with claim 5 wherein said pad has a surface conforming generally to the circular formation of said wall, said surface comprising a skin of impervious material.

8. A lawn mower in accordance with claim 5 wherein said pocket has lower and sidewalls, is open at the top, and has lips along the inner edges of said lower and sidewalls, and said pad is dimensioned to be snugly received in said pocket.

9. A lawn mower comprising a rotary cutting blade, a blade housing supporting said cutting blade and including a top deck and a circular wall adjacent to the path of said cutting blade, and a liner extending at least partially around the inner surface of said wall and cooperating with said wall to define at least one void for receipt of solid articles puncturing said liner in response to striking thereof consequent to being thrown by rotating action of said cutting blade.

10. A lawn mower in accordance with claim 9 wherein said liner has a flexible upper portion adapted to engage said top deck.

11. A lawn mower in accordance with claim 9 wherein said liner has a bottom surface extending radially outwardly and downwardly, whereby to deflect objects downwardly.

12. A lawn mower comprising a rotary cutting blade and a blade housing supporting said cutting blade and including an upper deck having a rearwardly extending deck portion, a circular wall depending from said deck adjacent to the path of said cutting blade and forwardly of said deck portion, said wall having therein an opening located between about 5:00 and about 7:00 o'clock, and a skirt extending downwardly from said deck portion in generally opposed relation to said wall, and means yieldably closing said opening and including a surface generally conforming to the circular formation of said wall.

13. A lawn mower comprising a rotary cutting blade, a blade housing supporting said cutting blade and including a top deck having therein an opening located between about 1:30 and about 5:00 o'clock, said housing also including a circular wall adjacent to the path of said cutting blade and having therein a pocket with an open top, a pad of cellular material located within said pocket for trapping objects thrown by rotating action of the cutting blade and a chute releasably connected to said housing in covering relation to and in communication with said opening and including a lip covering said open top of said pocket.

14. A lawn mower comprising a rotary cutting blade, a blade housing supporting said cutting blade and including a top deck having therein an opening located between about 1:30 and about 5:00 o'clock and a circular wall adjacent to the path of said cutting blade, means on the inside of said housing for trapping objects thrown by rotating action of the cutting blade, and a cover releasably connected to said housing in covering relation to said opening, said cover including an upright wall extending in the area between about 1:30 and about 5:00 o'clock and means on said upright wall for trapping objects thrown against said cover wall.

15. A lawn mower comprising a rotary cutting blade, a blade housing supporting said cutting blade and including a top deck having therein an opening located between about 1:30 and about 5:00 o'clock, said housing also including a circular wall adjacent to the path of said cutting blade and having therein a pocket with an open top, a pad of cellular material located within said pocket for trapping objects thrown by rotating action of the cutting blade, a member releasably connected to said housing in covering relation to said opening and to said open top, said member including an upright wall extending in the area between about 1:30 and about 5:00 o'clock, and means on said upright wall for trapping objects thrown against said cover wall.

16. A lawn mower in accordance with claim 14 wherein said means on said upright cover wall for trapping objects includes a pocket formed in said upright wall and further includes a pad of cellular material located within said pocket in said upright wall.

17. A lawn mower in accordance with claim 16 wherein said pad located in said pocket in said upright wall has a skin of impervious plastic material.

18. A lawn mower in accordance with claim 16 wherein said pocket in said member has upper and sidewalls, is open at the bottom, and has lips along the inner edges of said upper and side walls, and said pad in said pocket in said upright wall is dimensioned to be snugly received in said pocket in said member.

19. A lawn mower comprising a rotary cutting blade and a blade housing supporting said cutting blade and including an upper deck, a generally circular wall portion extending adjacent to the path of said cutting blade, said wall portion being spaced from and connected to said upper deck, to define an opening between said wall portion and said upper deck, and a skirt extending downwardly from said upper deck in generally opposed and in radially outward relation to said wall portion, and means yieldably closing said opening.

20. A mower in accordance with claim 19 wherein said means yieldably closing said opening includes a resilient guard fixed to one of said wall portion and said upper deck.

21. A mower in accordance with claim 20 wherein said means yieldably closing said opening also includes a member connected to the other of said wall portion and said upper deck and normally in engaged relation to said guard so as to thereby close said opening.

22. A mower in accordance with claim 19 wherein said skirt extends downwardly beyond the lower edge of said opening.

* * * * *